United States Patent Office 3,207,932
Patented Sept. 21, 1965

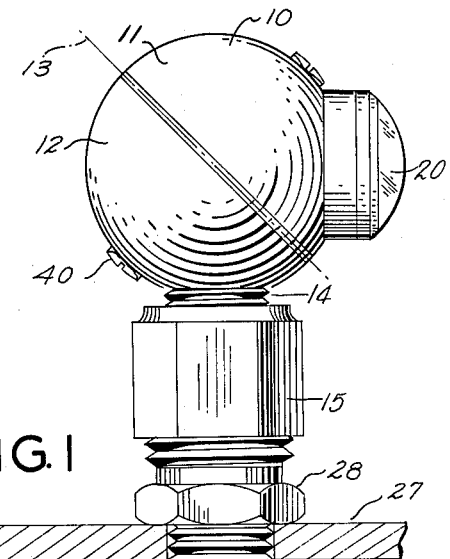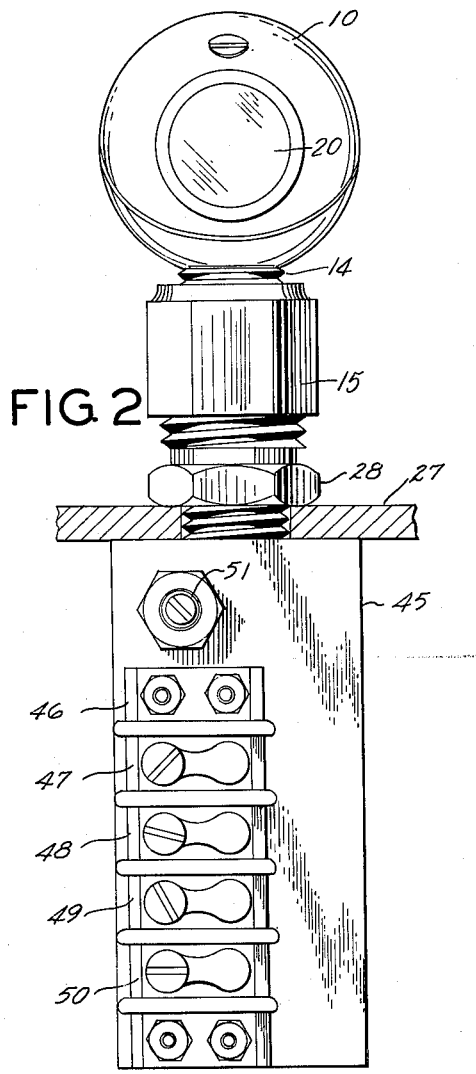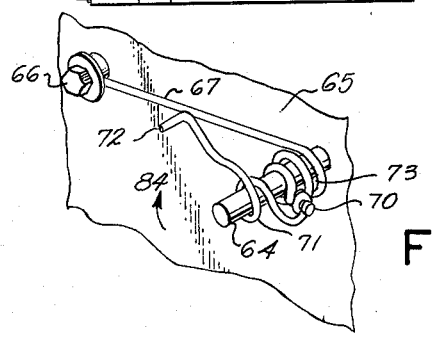

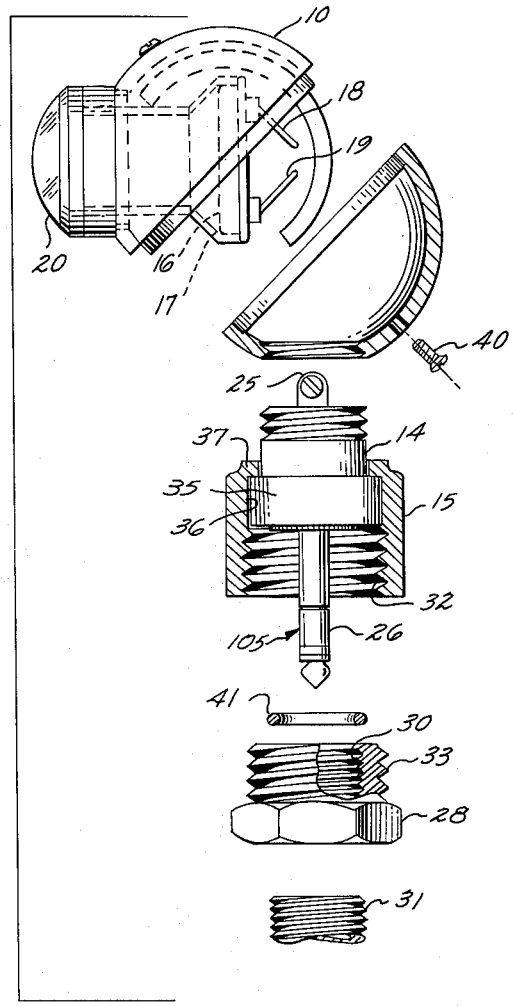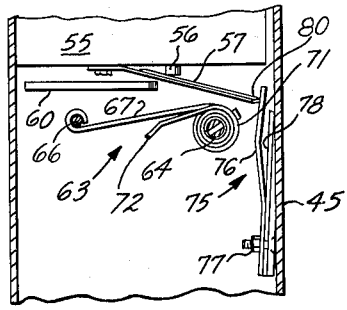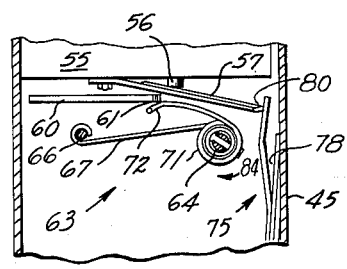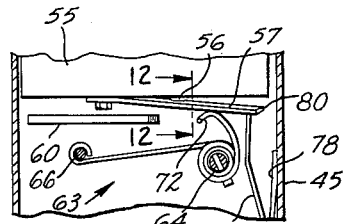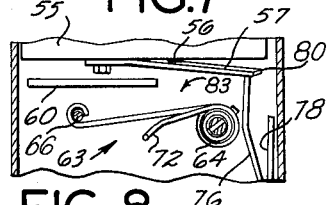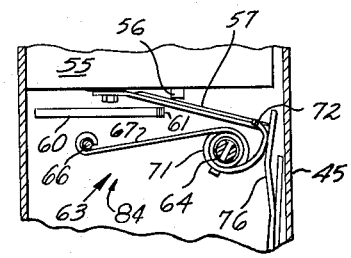
FIG. 5
FIG. 6
FIG. 7
FIG. 8
FIG. 4
FIG. 9
INVENTOR.
STEWART TONGRET
BY
R.E. Geangue
ATTORNEY

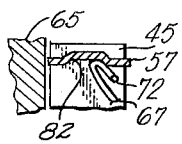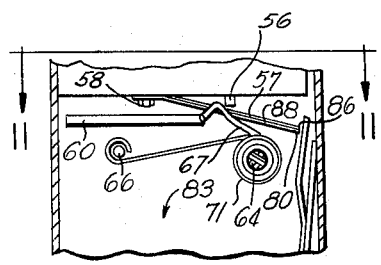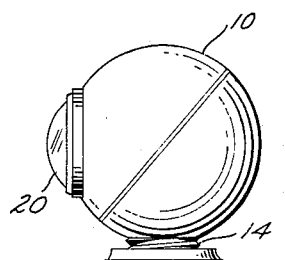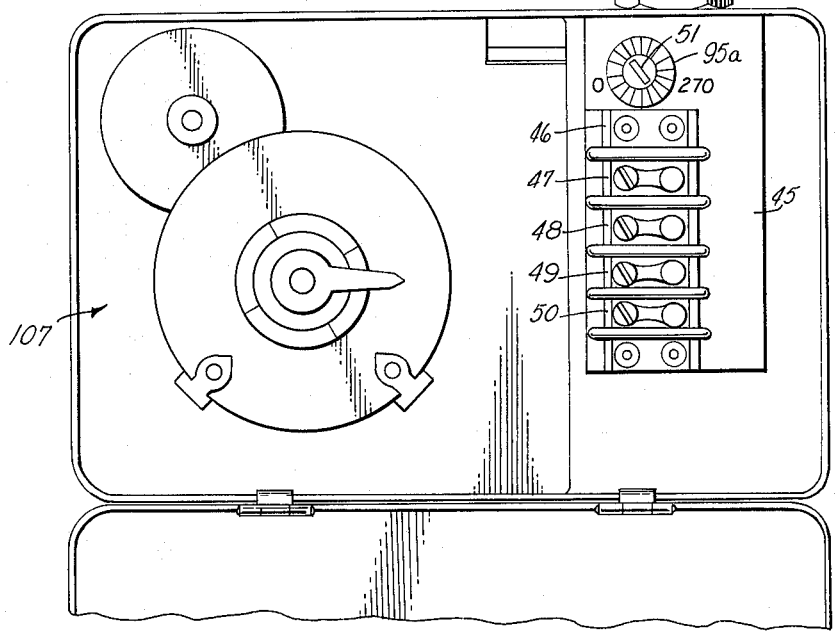

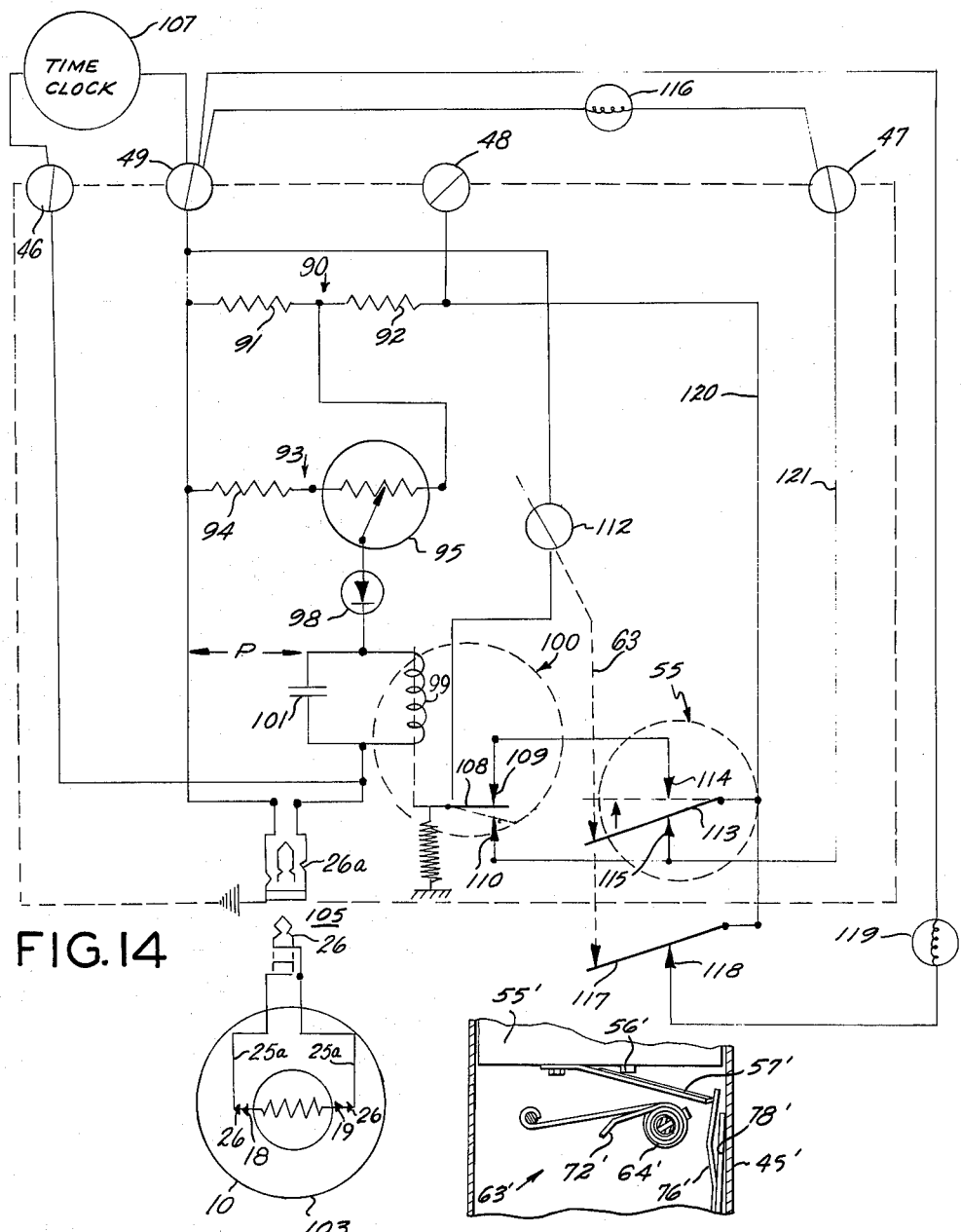

3,207,932
SWITCHING DEVICE AND CIRCUIT FOR
RADIATION SENSING APPARATUS
Stewart Tongret, Santa Monica, Calif., assignor to Basic Electronic Controls Incorporated, North Hollywood, Calif., a corporation of California
Filed Nov. 20, 1961, Ser. No. 153,456
1 Claim. (Cl. 307—141)

This invention relates to radiation sensing apparatus and more particularly to a novel time delay switch actuating mechanism and an electrical circuit therefor for selectively actuating the mechanism responsive to sensed radiation from a radiation sensor or from a predetermined setting of a switch such as a time clock or the like.

In the field of automatic and remote switch actuation many difficulties have been encountered in effecting the closure and opening of switch contacts in an electrical circuit for automatically and remotely supplying operating current to a given load. For example, it is highly desirable to illuminate business signs, billboards, parking lots, gas stations and the like during the late evening hours and during night time as well as day time during inclement weather such as foggy days. Usually, a variety of high wattage lamps or lights are employed for this purpose which are arranged in a strategic array about the area to be illuminated. It is necessary that the switch mechanism for supplying operating current to the lamps be non-responsive to spurious or random flashes of intense light which may normally, when sensed by an illumination sensor for example, actuate the switch mechanism at undesirable times. Furthermore, because of the heavy currents required by the lamps, the switch mechanisms are normally quite large in size and maintenance of the switch contacts is quite frequent due to breakdown of the contacts through arcing therebetween. Generally, when a time delay mechanism is employed to prevent random and spurious actuation of the switch contacts, many switch component parts are necessary such as clutch mechanisms which are generally made with great precision and therefore breakdown is common. It is also desirable that the switch contacts for supplying the operating lamp current be actuated by a manual setting on a time clock as well as actuation by remote sources such as an illumination sensor adapted to effect switch contact closure depending upon natural light conditions of day and night.

To obviate the above difficulties as well as to provide an improved and compact switch mechanism free from service difficulties, the present invention provides an illumination sensor which is sensitive to the natural light conditions as well as to artificial light sources which when actuated causes the switch mechanism to close after a predetermined time and thereby supply operating current to various lamps or lights. The switch mechanism incorporated in the present invention provides a time delay feature which involves the storing of energy so that when released, switch contacts will instantaneously close to obviate any possibility of contact arcing.

It is a primary object of the present invention to provide an illumination sensor and time delay mechanism which is versatile and which may be readily mounted and installed in conjunction with a variety of switching apparatus such as time delay clocks or other supporting structure so that the illumination sensor is permitted full adjustable rotation in elevation as well as azimuth.

It is another object of the present invention to provide an illumination sensor device which may be easily connected and disconnected with its associated switching and timing circuitry.

It is another object of the present invention to provide a time-delaying latch switch mechanism which may be readily adjusted to provide a predetermined time delay before actuation of a switch mechanism connected in a lighting circuit or the like.

It is another object of the present invention to provide a switch actuation latch mechanism which is adaptable for storing energy during a prescribed time period and at the end of this period rapidly and positively effect the closure of switch contacts to reduce or eliminate arcing between the contacts.

Still a further object of the present invention is to provide a switch actuating latch mechanism which because of its rapid and positive switch contact closure permits the handling of increased current loads over and above the normal switch contact current rating level.

Still a further object of the present invention is to provide a switch actuating latch mechanism which is of unitary design and yet is capable of effecting switch contact closure as well as the opening of the switch contact without the necessity of clutches or lost-motion mechanisms.

Still another object of the present invention is to provide a switch latch mechanism which travels in a first direction to effect a time delay closure of switch contacts and after return to its initial position effects switch contact opening when traveling in the first direction during a second cycle. The path of travel representing a parallelogram configuration so that the mechanism can return to its initial position of rest between actuating the switch contacts closed or opened.

A further object of the present invention is to provide a novel illuminating control circuit wherein an electrical circuit may be selectively opened and closed responsive to a time clock setting, or the like, as well as ambient light conditions. The novel circuit includes a time delay latching mechanism so that spurious intense light from random sources will not inadvertently actuate the control circuit.

Other objects of the present invention and the various advantages and characteristics of the present time delay mechanism and illumination sensor circuit will be apparent from a consideration of the following detailed description when taken in connection with the accompanying drawings of a typical embodiment of the present invention in which like numbers of reference denote corresponding parts throughout the several views and circuit diagram thereof.

FIGURE 1 is a side-elevational view of an illumination sensor and control in accordance with the present invention showing a switch actuator mechanism through a broken-away portion of the mechanism casing;

FIGURE 2 is a front elevational view of the illumination sensor and control illustrated in FIGURE 1 showing the electrical circuit terminals employed in the control circuit of the present invention;

FIGURE 3 is an enlarged perspective view of the switch actuator mechanism shown in FIGURE 1;

FIGURE 4 is an exploded assembly view of the illumination sensor portion of the present invention;

FIGURE 5 is a side view of the switch actuator mechanism and switch latch of FIGURE 1 shown in an initial position such as during daylight;

FIGURE 6 is a side view of the switch actuator mechanism and switch latch of FIGURE 5 shown in a partially advanced position such as at nightfall;

FIGURE 7 is a side view of the switch actuator mechanism and switch latch of FIGURE 6 shown in a three-quarter advanced position to actuate a switch contact;

FIGURE 8 is a side view of the switch actuator mechanism and switch latch shown fully returned to the initial position as shown in FIGURE 5 while the switch latch is retained to maintain the switch contact closed such as during night;

FIGURE 9 is a side view of the switch actuator mechanism and switch latch showing the mechanism in its fully advanced position to release the switch latch as at daybreak;

FIGURE 10 is a side view of the switch actuator mechanism shown returning to its initial position as in FIGURE 5 after release of the switch latch;

FIGURE 11 is a sectional view of the switch actuator mechanism and switch latch taken in the direction of arrows 11—11 of FIGURE 10;

FIGURE 12 is a sectional view of the switch latch taken in the direction of arrows 12—12 of FIGURE 7;

FIGURE 13 is a side elevational view of the illumination sensor and control of FIGURE 1 incorporated in a time clock;

FIGURE 14 is a schematic diagram showing the electrical circuit of the present invention employed in the apparatus of FIGURE 13; and FIGURE 15 is a side view of the switch actuator mechanism showing its operation without having a latch abutment such as is employed with reference to the embodiments shown in FIGURE 5-10.

With reference to FIGURES 1 and 2, a radiation sensing and responsive device, such as a photoelectric cell 103, is shown which includes a housing 10 which includes a pair of hollow hemispherical members 11 and 12 which are nested together on a plane 13 extending at an acute angle with respect to the axis of support 14. The housing 10 is attached on the support which, as shown in FIGURE 4, has its upper end threaded and matingly engaged in a threaded portion of the housing 10.

With reference to FIGURE 4, inside housing 10 there is provided a radiation sensitive wafer 16 which is carried on a mounting 17 having electrical connectors 18 and 19 attached thereto. The radiation sensitive material is arranged in direct alignment with a lens or window 20 which is transparent to radiation for activating the radiation sensing material 16. It is also possible to employ a device such as described and shown in U.S. Patent 2,890,351 which relates to an adjustable housing for radiation devices.

The support 14 is provided at one end with a pair of screw connectors, such as the one shown at 25, extending into the housing and having wires 25a (FIGURE 14) connected thereto extending into mechanical and electrical connection with the members 18 and 19. Internally of the support 14, connectors 25 electrically are coupled with the prong 26 of a plug jack 105 (FIGURE 14) which is of conventional design so that proper electrical contact can be made with the sensing material 16 via the plug jack 105.

Support member 14 including its integral prong 26 is mounted on a structure 27 (FIGURE 1) by means of a jam nut 28 having an internally threaded bore 30 which is engageable with an externally threaded projection 31 carried on a case or housing 45 (FIGURE 1) extending through the supporting structure 27. A mounting nut 15 is provided with an internally threaded bore 32 adapted to engage with the external threads 33 on nut 28.

Support 14 is provided with an enlarged annular portion 35 which is received into a smooth bore portion 36 of the mounting nut 15 and is retained in this portion by means of an annular shoulder 37 engaging with one end of portion 35 while the extreme end of nut 28 engages the opposite end of portion 35. Thereby, by loosening nut 28, the sensor housing 10 may be rotated horizontally about the axis of the support 14 for all horizontal adjustments.

A washer 41 is employed to cushion and seal the abutment between nut 28 and the lower end of enlarged portion 35.

Prong 26 projects through projection 31 into the interior of a switch case on housing 45 which includes a female socket 26a (FIGURE 14) which, in turn, couples the sensing device 103 into the electrical switching circuit of the present invention.

FIGURES 1 and 2 also show a plurality of terminal connectors carried on the outside of housing 45 which are incorporated into the switching circuit. For example, contact or terminal 46 may be employed for attachment to a time clock 107 (FIGURES 13 and 14) and contact or terminal 47 may be attached to a load 116 (FIGURE 14) which may be represented by lights to be lit upon certain sensed conditions. Contact or terminal 48 may be connected to the positive source of potential coming from a suitable electrical source (not shown) while contact or terminal 49 may be considered neutral and contact or terminal 50 may be employed for a ground. A shaft 51 projects from the side of housing 45 and serves as the rotary member of a potentiometer 95 (FIGURE 14) which when adjusted determines the light level actuation of the sensing device. A suitable scale 95a (FIGURE 13) may be employed about the shaft 51 so that discrete numbers or units may be applied to the light level scale.

The broken-away portion of the housing 45 as shown in FIGURE 1 exposes the location of a micro-switch 55 having an actuator member, switch plunger 56, operated by depression of an actuator bar, latch 57. FIGURE 12 illustrates the cross section of latch 57 wherein said latch is provided with a longitudinal groove 82 to provide a track for movement of a bar 72 when contact is made between bar 72 and latch 57 as hereinafter described. The terminal, cantilevered end 80 of latch 57 is provided with an angular edge 86 (FIGURE 11) cut at approximately a 45 degree angle to the longitudinal edge 88. Latch 57 is secured to the side of switch 55 by a screw fastener 58 and bends outwardly from the switch at about a 30 degree angle to extend over the plunger 56. Adjacent the switch 55 in spaced relationship to the latch, there is provided an abutment, flange 60, having its end 61 terminating in close proximity of the latch 57 and plunger 56.

Also exposed by this view is a switch actuating mechanism shown in the general direction of arrow 63.

FIGURE 3 more clearly shows the switch actuating mechanism 63 which includes a drive motor (shown schematically at 112 in FIGURE 14) having a rotary output shaft 64 which extends outwardly through a plate 65 into an area near the terminal cantilevered end 80 of latch 57. Secured to plate 65 in fixed spaced relationship with respect to the shaft 64 and in an area adjacent fastener 58, there is provided a retainer means 66 which serves to fasten or hold one end of a resilient member, wire 67. Wire 67 extends directly from the retainer means 66 to shaft 64 and then is wound about shaft 64 to form coil spring 73 whereby rotation of shaft 64 in a first direction as indicated by arrow 84 shall tighten the coils of spring 73. Wire 67 continues from pin 70 and is wrapped about the projecting end of shaft 64 to form a single turn coil spring 71 and then directed outwardly in cantilevered fashion to terminate in the form of the bar 72 formed by a right angled bend in wire 67 outwardly from plate 65.

With respect to FIGURE 5, the switch actuating mechanism 63 and the latch 57 as well as the micro-switch 55 are shown in a position generally representative of the daylight position when the load, such as lights, are rendered non-energized and inactive. FIGURE 5 shows the terminal end of latch 57 engaged with a restraining means 75 which comprises a leaf spring 76 fastened to the wall of housing 45 by a fastener 77. Leaf spring 76 is supported on a bar 78 which provides leverage for the springing action of leaf spring 76.

FIGURE 6 illustrates the relative position of the components as shaft 64 rotates in the first direction 84, said rotation being activated by the sensing circuit to be hereinafter described. This position is generally representative of nightfall. Bar 72 is temporarily restrained from movement by end 61 of flange 60 causing a tightening and increase of the energy state of coil spring 71. After a predeterminable rotation of shaft 64, bar 72 shall disengage flange 60 and the stored energy within coil spring 71 shall be released and cause bar 72 to rapidly strike and move latch 57 in an upward direction and thereby depress switch plunger 56 and effectuate an instantaneous closing of switch contacts 114 and 115 within micro-switch 55 to supply operating current to the load 116 (FIGURE 14). This position of the components is indicated in FIGURE 7. Leaf spring 76 which had been compressed by the terminal end of latch 57 now expands to its free state and restrains latch 57 from returning to its free state thereby assuring depression of switch plunger 56.

Attention is now called to FIGURE 8. The activation of the micro-switch 55 cuts off the power source to the drive motor 112, as hereinafter described, causing shaft 64 to cease rotation in the first direction 84. The stored energy within coil spring 73 returns the switch actuating mechanism in a second direction as indicated by arrow 83 to its initial position. This position is normally associated with the night time hours wherein the load is supplied operating current, such as the energizing of lights.

FIGURE 9 illustrates the operation of this invention when a sustained stimulus causes the drive motor to operate and rotate shaft 64 in the first direction 84, this period normally occurring at daybreak. Shaft 64 rotates in the first direction 84 whereby bar 72 is temporarily restrained from movement by end 61 of flange 60 causing a tightening and increase of the energy state of coil spring 71. After a predetermined rotation of shaft 64, bar 72 disengages flange 60 and the stored energy within coil spring 71 shall be released and cause bar 72 to rapidly strike leaf spring 76 forcing it to a compressed state thereby permitting latch 57 to disengage switch plunger 56 and return to its free state thus opening its switch contacts 114 and 115 and de-energizing the load 116.

With reference to FIGURES 10, 11 and 12, the stored energy within coil spring 73 returns the switch actuating mechanism 63 in the second direction 83 from its FIGURE 9 position to its initial position. As wire 67 begins the return cycle to its initial position in the second direction, bar 72 contacts angular edge 86 at the terminal end 80 of latch 57 whereby the spring force in the second direction against the angular edge 86 forces the resilient bar 72 to the longitudinal edge 88 of the latch 57 thereby avoiding depression 82 of latch 57 and switch plunger 56 and rendering no change to the switch contacts 114 and 115 by this movement in the second direction.

It will be apparent to one skilled in the art that spurious activations of the drive motor 112, such as caused by random flashes of intense light, will not cause any change in the position of switch contacts 114 and 116 in micro-switch 55. Momentary activation of the drive motor causes shaft 64 to rotate in the first direction 84 whereby bar 72 rotates towards contact with latch 57; however, upon cessation of the momentary activation of the drive motor, the stored energy within coil spring 73 causes shaft 64 to return in the second direction 83 to its initial position. It is therefore necessary to have a predetermined sustained operation of the drive motor 112 to cause shaft 64 to rotate in the first direction and effect a change in the postion of the switch contacts 114 and 115 in micro-switch 55. The time delay from the activation of the drive motor until the operation of the micro-switch 55 may be governed by several factors such as the rotational speed of shaft 64 or the spring constant of wire 67.

Reference is now made to FIGURE 14 which shows a circuit in accordance with one embodiment of the present invention for controlling the energization of the load device 116, such as lights. A power supply circuit is provided comprising a first voltage divider 90 including resistances 91 and 92 and a second voltage divider 93 including resistance 94 and the potentiometer or adjustable resistance 95. Alternating current electric power is applied to the power supply circuit through terminals 48 and 49. Diode 98 is provided to rectify the alternating current and supply direct current to the coil 99 of a relay 100 which includes a smoothing capacitor 101.

Means are provided to control the flow of current through the coil 99 and may take the form of a radiation responsive device such as photocell 103 connected to the circuit including coil 99 through plug jack connection 105. As an alternative means for controlling the flow of current through the coil 99, a time clock 107, pre-set in accordance with a desired mode of operation may be provided.

The relay 100 includes a spring loaded armature 108 operable between two contact members 109 and 110. The drive motor 112, which motivates actuating mechanism 63, is electrically connected between neutral terminal 49 and the armature 108 of relay 100.

Operably connected to the motor 112 through operation of actuating mechanism 63 is a micro-switch 55 having an armature 113 operable between two contact members 114 and 115, which are also electrically connected to the contacts 109 and 110 of relay 100. The load device 116, such as lights, is connected between neutral terminal 49 and the load terminal 47 which is in turn connected to contacts 115 and 110 of the micro-switch 55 and relay 100.

If it is desired to control the energization of more than one load device, additional armatures and contacts may be provided, such as armature 117 and contact 118 and also operable with motor 112 through the action of actuating mechanism 63 to supply operating current to alternate load 119.

In operation of the circuit, with, for example, the photocell 103, connection is made with the power supply circuit and relay coil 99 through plug jack 105, and can be considered as a variable resistance in series with coil 99 of the relay. The armature 108 of relay 100 and the armature 113 of micro-switch 55 are shown in the night time position. During this darkness period the photocell 103 has a relatively high resistance which limits the current through the coil 99 which is unable to attract the armature 108 to effect connection with contact 110. With the armatures as shown, a completed electric circuit is provided for the load device 116, from the power terminal 48 via line 120 through armature 113 to contact 115 of the micro-switch 55 and back to neutral terminal 49 through the load 116 by way of line 121. Since the armature 108 of relay 100 is not engaged with contact 110, the motor 112 does not have a completed electric circuit and therefore de-energized.

When the photocell 103 senses daylight, its resistance decreases and allows a greater current to flow through the relay coil 99. This increase in current causes the relay 100 to move armature 108 to contact 110 and this point at which this action occurs may be governed by the adjustable resistance 95. With the armature in engagement with contact 110 (shown in dotted lines), an electric circuit to the motor 112 is completed from power terminal 48 through line 120, through armature 113 and contact 115 of the micro-switch 55, through the relay 100, motor 112 and back to the neutral terminal 49.

As the motor 112 rotates, it urges the actuating mechanism 63 into engagement with the actuator bar, flange 57, and after a time delay as previously described, causes the armature 113 of micro-switch 55 to snap out of engagement with contact 115 and into engagement with contact member 114 wihch opens the completed circuit to the motor 112 thereby stopping its rotation and which action also opens the completed circuit to the load device 116 to de-energize it. When darkness again occurs, the photocell 103 resistance increases causing the relay 100 to drop out and move armature 108 back into engagement with contact 109 which completes the motor circuit to cause armature 113 of micro-switch 55 to snap back to contact 115 after a short time delay which action breaks the motor circuit and completes the load circuit.

If it is desired to energize the load device 116 in accordance with a predetermined period of operation other than light, the time clock 107 may be placed in the circuit instead of the photocell 103.

It may be seen therefore that a load device in a load circuit is energized in a predetermined mode of operation for example time or light and dark responsive, by operation of a motor controlled by the mode of operation, and which is operable with a switch means located in the load circuit.

Referring in detail to FIGURE 15, a modified embodiment of the switch-actuating mechanism of this invention is shown and designated by the numeral 63', the instant embodiment being identical to the first embodiment with the exception that the flange 60 of the first embodiment is omitted. In the instant embodiment like parts similar to the first embodiment are referred to by like numbers which are primed.

The switch actuating mechanism 63' includes a rotary output shaft 64' mounted in the housing 45' for rotating a single turn coil spring similar to the spring 71 of the first embodiment directed outwardly in cantilevered fashion to terminate in the form of a bar 72' coactive with a latch 57' of a micro switch 55' to engage a plunger 56' of the micro switch 55' to actuate the micro switch. The bar 72' is held in actuated position by a leaf spring 76' in the manner taught in relationship of the leaf spring 76 of the first embodiment to its bar 72. The snap action in the instant embodiment occurs solely in the micro switch 55' rather than in the additional snapping action as provided by the flange 60 of the first embodiment.

While there is herein shown and described what is conceived to be the most practical and preferred embodiments of this invention, it is recognized that departures may be made therefrom within the scope of this invention which is not limited to the details disclosed herein but is to be accorded the full scope of the claim so as to embrace any and all equivalent devices.

Having described the invention, what is claimed as new and desired to secure by Letters Patent is:

In combination with an electrical circuit for controlling a load in response to radiation, said circuit including first and second power supply contacts, means for preventing spurious radiation from affecting said load comprising:
  a radiation sensor connected in said circuit;
  a relay connected to said sensor, said relay including an armature and first and second contacts, said armature engaging said first relay contact when said sensor senses a first level of radiation and being moved into engagement with said second relay contact when said sensor senses a second level of radiation;
  an electric motor;
  a first lead connecting said relay armature to said motor;
  a second lead connecting said motor to said first power supply contact;
  a switch connected in said circuit for controlling energization of said load, said switch having an armature and first and second contacts, said armature being selectively engageable with said first and second switch contacts;
  a third lead connecting said switch armature to said second power supply contact;
  a fourth lead connecting said first switch contact to said first relay contact;
  a fifth lead connecting said second relay contact and said second switch contact to said load;
  a sixth lead connecting said load to said first power supply contact; and
  time delay means connected to said motor for moving said switch armature from one switch contact to the other switch contact a predetermined period of time after said motor is energized.

References Cited by the Examiner

UNITED STATES PATENTS

| | | | |
|---|---|---|---|
| 2,828,450 | 3/58 | Pinckaers | 317—148.5 |
| 2,928,027 | 3/60 | Dennison | 317—22 X |
| 2,946,902 | 7/60 | Hagen | 307—141.4 |
| 2,954,489 | 9/60 | Brueggeman et al. | 307—117 |
| 2,978,591 | 4/61 | Ringger | 317—124 X |
| 2,995,671 | 8/61 | Fisher | 307—141 |
| 2,996,585 | 8/61 | Lehde | 200—39 |
| 3,036,167 | 5/62 | Bacchi | 200—38.1 |
| 3,057,973 | 10/62 | Goodhouse | 200—38.1 |
| 3,080,491 | 3/63 | Howell | 307—117 |
| 3,098,448 | 7/63 | Gisser et al. | 307—141.8 X |
| 3,129,371 | 4/64 | Bourguignon | 317—124 X |
| 3,136,926 | 6/64 | Smith | 317—124 X |

LLOYD McCOLLUM, *Primary Examiner.*